United States Patent [19]

Kliem

[11] Patent Number: 4,731,646
[45] Date of Patent: Mar. 15, 1988

[54] MOVING-IMAGE CODER WITH SELF-IDENTIFICATION OF THE STUFFING CHARACTERS

[75] Inventor: Helmut Kliem, Berlin, Fed. Rep. of Germany

[73] Assignee: Krone GmbH, Berlin, Fed. Rep. of Germany

[21] Appl. No.: 884,542

[22] Filed: Jul. 11, 1986

[30] Foreign Application Priority Data

Jul. 15, 1985 [DE] Fed. Rep. of Germany ....... 3525567

[51] Int. Cl.$^4$ ............................................. H04N 11/04
[52] U.S. Cl. ...................................... 358/13; 375/118; 370/102
[58] Field of Search ................. 375/112, 118; 370/102, 370/108; 358/11, 13, 258

[56] References Cited

U.S. PATENT DOCUMENTS

| 4,320,419 | 3/1982 | Cottraill | 358/258 |
| 4,561,100 | 12/1985 | Asao | 375/118 |
| 4,622,579 | 11/1986 | Starck | 358/13 |

FOREIGN PATENT DOCUMENTS 2935291 1/1981 Fed. Rep. of Germany .

OTHER PUBLICATIONS

"PCM NTSC Television Characteristics", by A. A. Goldberg in SMPTE Journal, vol. 85, No. 3, Mar. 1976.
"Space-Division Digital Newtorks for Video Signals", by Noriyoshi Kuroyanagi; IEEE Transactions on Communications; vol. Com-20, No. 3, Jun. 1972.

*Primary Examiner*—Michael A. Masinick
*Attorney, Agent, or Firm*—St. Onge Steward Johnston & Reens

[57] ABSTRACT

A method and apparatus are described for adjusting clock pulses of time-equidistant digital line scanning values of a moving-image signal present in a composite color video signal to a clock used in a digital transmission link by means of a moving-image coder. In the transmitting part (10) of the moving-image coder, self-identifying stuffing characters are inserted into the string of image scanning values if clock deviations are found. The identification may be carried out by means of an additional bit or, alternatively, by a special code word when this is first removed from the supply of image scanning values. In the receiving part (30) of the moving-image coder, the stuffing character is recognized and removed and the original character string is restored.

13 Claims, 5 Drawing Figures

MOVING-IMAGE CODER WITH SELF-IDENTIFICATION OF THE STUFFING CHARACTERS

This invention generally relates to a method and apparatus for digitally transmitting and receiving a color video signal. More specifically, this invention relates to a process and apparatus for adjusting the clock pulse rate of equally-time-spaced digital image scanning values of a moving-image signal present in a composite color video signal so as to be compatible with the pulse rate used in a digital transmission link.

In the digital transmission of moving-image signals present in composite color video signals, a fixed orthogonal scanning of the signals is used, i.e., a sampling of the video signal at a clock frequency that is correlated with the scanning line frequency present in the video signal is done, for example by using a sampling frequency which is an integral multiple of the scanning line frequency.

In practice, the operation of an image camera and that of a digital transmission link are usually not synchronized with each other, so that there is no fixed relationship between the line frequency of the image signals and the clock pulse of the transmission link. In order to be able to nevertheless transmit the generated digital scanning values through a digital channel operating at a fixed pulse rate in a fixed bandwidth, the channel must, in principle, operate at a pulse rate which is somewhat larger than the pulse rate attributable only to the digital sampling of the video signal, the scanning rate. The difference between the available channel transmission capacity and the scanning rate is compensated for by the insertion of stuffing bits or stuffing characters. In order to be able to differentiate stuffing bits or stuffing characters from useful bits or from useful characters, the former must be identified as such.

The fundamental idea of using stuffing characters for the adjustment of source signals to the capacity of a transmission channel originates from von S. Butman, Synchronization of PCM Channels by the Method of Word Stuffing, IEEE Trans COM. 1968, pages 252-254. The use of this idea for the synchronization of digital networks is described in German OLS [unexamined patent application] No. 2,925,391 and in German OLS No. 3,101,536.

From German OLS No. 3,213,534 there is known a 139.264 MHz time multiplex system, whose frame structure permits a transmission of a moving-image channel with 136.256 Mbit/second and of a broad-band channel with 2,048 M/bit/second.

In the case of clock deviations in asynchronous networks, clock rate compensation during transition from one part of the network to another at a corresponding node is compensated for by means of positive/negative bit stuffing or in an alternative form positive/negative character stuffing that are awkwardly identified.

A disadvantage of stuffing processes with such awkward identification is that, after the composite color video signal is converted back, interfering, low-frequency components remain in the signal as a result of a so-called waiting time effect.

It is, therefore, an object of the invention to provide a method and apparatus for compensating for differing pulse rate in a digital video transmission in a manner that does not contain interfering frequency components.

This is achieved in accordance with one technique in accordance with the invention by generating a stuffing character immediately upon recognition of a stuffing requirement with a self-identification code. This self-identified stuffing code is passed into the outgoing transmission channel as an adjustment of the scanning rate, the video signal sampling rate, to fill the channel bit-rate capacity. The stuffing characters are identified by an additional bit at the transmitting part of a moving-image coder. At the receiving end, the stuffing character's additional bit is recognized to suppress the associated stuffing character and thus reproduce the original character string associated with the sampled video signal.

The insertion of the stuffing character is carried out in the transmitting part of the moving-image coder by means of a stuffing processor. This includes a phase detector for generating a stuffing command in the case of an excessively low time interval between a read pulse and associated write pulse applied to an elastic storage where the digital samples are stored. A blocking gate is used to suppress a read pulse from an image channel clock for the duration of a character. A stuffing character generator is used to transmit a stuffing identification bit to a channel multiplexer.

The recognition and subsequent removal of the stuffing character additional bit takes place in a de-stuffing processor part of a receiver. The de-stuffer contains a blocking gate to prevent input of the stuffing character into an elastic storage. A phase control circuit, consisting of a phase detector, a PLL filter, and an oscillator, for generation of a 13.5-MHz clock, is used to read-out the original image characters from the elastic storage and enables subsequent conversion to the composite video signal.

As a result of these measures on the transmitter and receiver side of a digital transmission link, interfering low-frequency components in the composite color video signal are avoided. In addition, the complexity of the circuit and the engineering effort needed to adjust the clock rates with respect to the transmission link and the awkward identification of stuffing characters is reduced.

Other advantageous embodiments of the invention include the stuffing with characters which themselves are identified by a code word that is not contained in the digitized values of the composite video signal and are recognized and removed at the receiving end, so that the original evenly-time-spaced character and line string is reproduced.

As further described herein, the stuffing processor at the transmitter end of the moving-image coder consists of a stuffing character generator, driven by a phase detector. A stuffing character code word is transmitted through an OR-operation through the channel multiplexer. A character modifier is used to alter preselected image scanning values, generated ahead of the elastic storage, to enable the use of a unique code word for identification of the stuffing characters.

At the receiver end, the stuffing processor part includes a stuffing image detector which, upon appearance and recognition of a stuffing character code word, prevents by way of a blocking gate, the input of this character into the elastic storage. A phase control circuit is used consisting of a phase detector, a PLL-filter and an oscillator, for the generation of an evenly-time-spaced read clock, whose exact frequency corresponds to the frequency of the image character string entered into the storage.

These and other advantages of the invention can be understood from the following detailed description. The invention is explained in greater detail on the basis of the embodiments shown in the drawings, in which.

Figure 1:
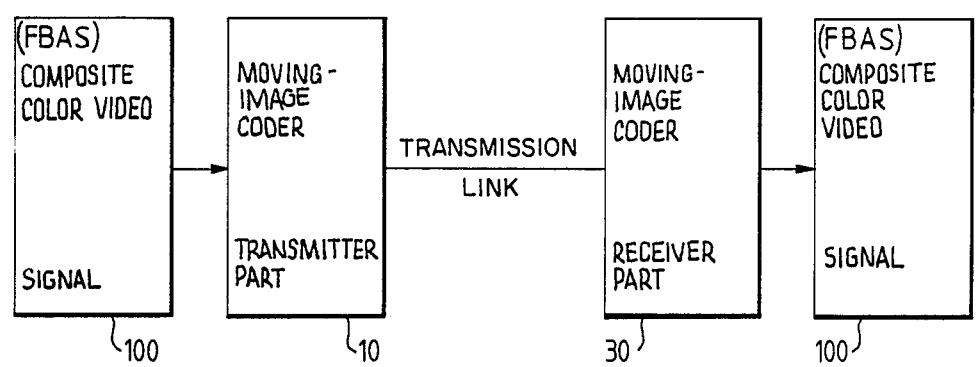
FIG. 1 is a block diagram of a moving-image coder for the digital transmission and reception of digital moving-image signals.

With reference to FIG. 1 an instrument for the digital transmission of moving-image signals in the form of a composite color video signal is shown. A composite color video signal 100 is supplied to the transmitter part 10 of a moving-image coder 10. In transmitter 10 the analog composite video signal is converted into a digital signal by equal-time-spaced and coherent, line-synchronous sampling (scanning) and by subsequent analog to digital conversion at a gross bit rate of 135 MBits/-second. With the addition of stuffing characters, the digital signal is inserted into a channel of slightly higher bit-rate capacity and which is part of a time division multiplex digital link suitable for the transmission of the digital signal. In this form, the digitized composite video signal passes through the digital transmission section, consisting of a transmitter, a transmission link A, and receiver, to the receiving part 30 of the moving-image coder. In part 30 the stuffing characters are removed and the original equal-time-spaced digital character string is reproduced by a phase control. The original composite color video signal 100 is then reconstructed from the digital character string by subsequent digital-to-analog conversion.

Figure 2:
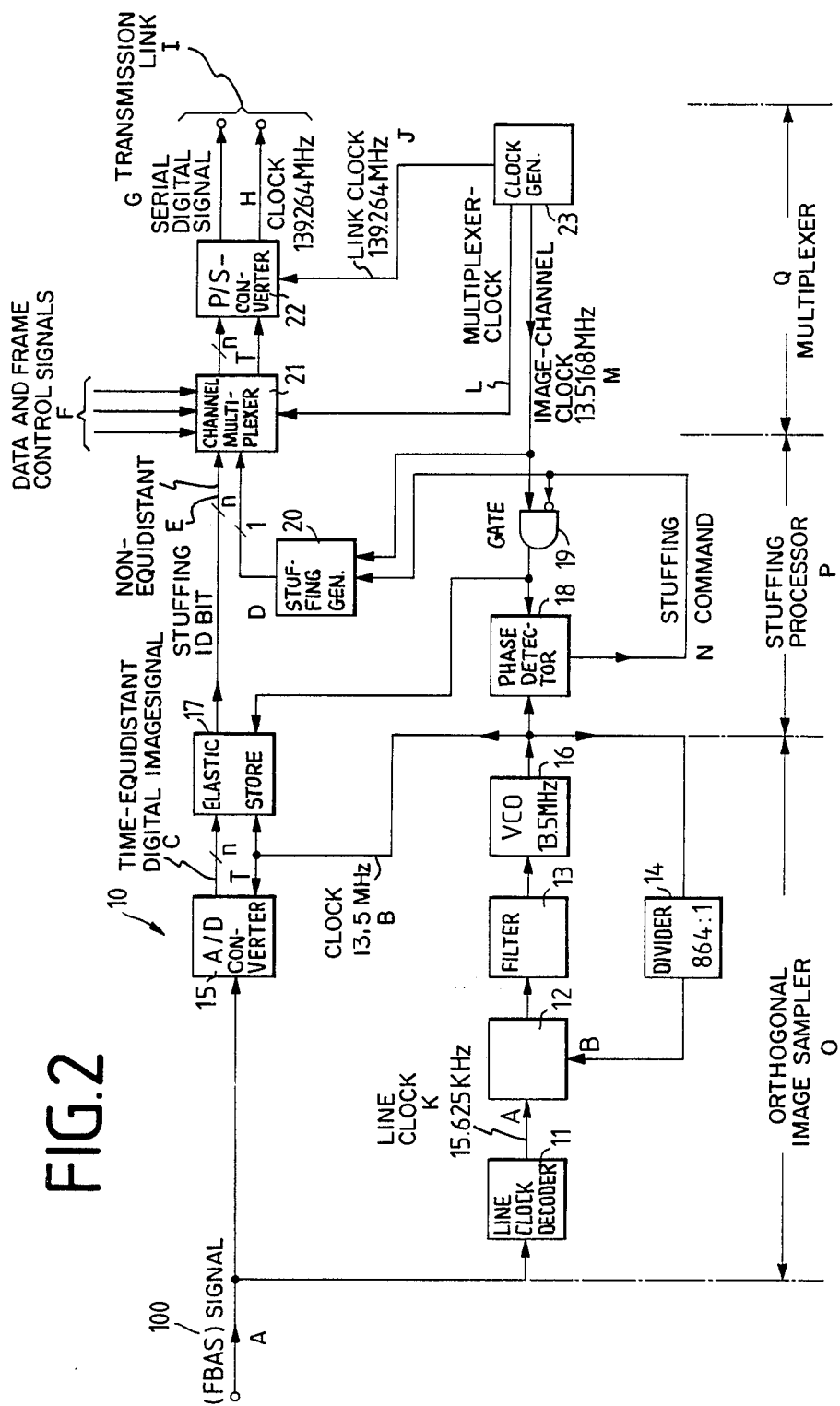
FIG. 2 is a block diagram of the transmitter part of the moving-image coder.

FIG. 2 shows a block diagram of the transmitting part 10 of a moving-image encoder/decoder wherein the stuffing characters are self-identified by means of an additional bit. The composite color video signal on line 100 is coupled to a line clock decoder 11 which derives the 15,625 MHz line clock of the image signal from the composite color video signal and applies it to input A of a phase detector 12. The clock pulses from a voltage-controlled 13.5 MHz oscillator 16 after it has been divided by a factor of 864 in divider 14, are applied to a second input B of phase detector 12. Through the action of the phase control loop formed by phase detector 12, PLL filter 13, oscillator 16, and divider 14, the 13.5 MHz clock pulse from oscillator 16 is synchronous with the line clock of the composite color video signal on line 100. The composite color video signal is sampled or scanned with the 13.5 MHz clock pulse and is converted to an equal-time-spaced PCM character string by means of a small n-stage analog-to-digital converter 15 (n=9). The sampling clock on line B is synchronous with the line clock and thus shows the desired orthogonality with the image signal. The characters consisting of n=9 bits are entered in parallel form into an elastic buffer 17 with the 13.5-MHz clock pulse on line B.

The read-out of characters from the elastic storage 17 and their transfer to channel multiplexer 21 are carried out with the use of a 13.5168 MHz image channel clock pulse generated on line M in the clock pulse generator 23. This, in turn, is synchronous with a transmission clock pulse of a 139.264-MHz time division multiplex line I through which the digital image is to be transmitted. The frequency of the image channel clock pulse on line M is slightly higher than the frequency of the character string temporarily stored in the elastic storage 17. The read-out from storage 17, therefore, takes place somewhat more rapidly than the arrival of pulses to its input.

A pulse stuffing technique is used to regenerate a pulse train of equally-spaced pulses at the higher clock rate. This is done by sensing when the time interval between a read pulse on line M with respect to a write pulse from clock pulses on line B for the same character reaches a preset lower limit. In such event, a phase detector 18 generates a stuffing command on line N. This has two effects: First, through the action of the blocking gate 19, a single read pulse from the image channel clock pulses is suppressed, so that the read-out from the elastic storage 17 is omitted for the duration of one character. Write and read pulses assigned to each other are then again sufficiently separated in time. Secondly, the stuffing character generator 20 puts out a stuffing-identification bit k ="1" on a separate line D for the duration of a character clock pulse and this is coupled to the channel multiplexer 21.

In the channel multiplexer 21, the 9-bit image characters from storage 17 and the additional bit are combined in 10-bit time slots of the available 135.168-MHz image channel and are conducted to the parallel-to-series converter 22. The image signals are finally fed to subsequent transmission devices in serial form within the 139.264-MHz time division multiplex link.

Figure 3:
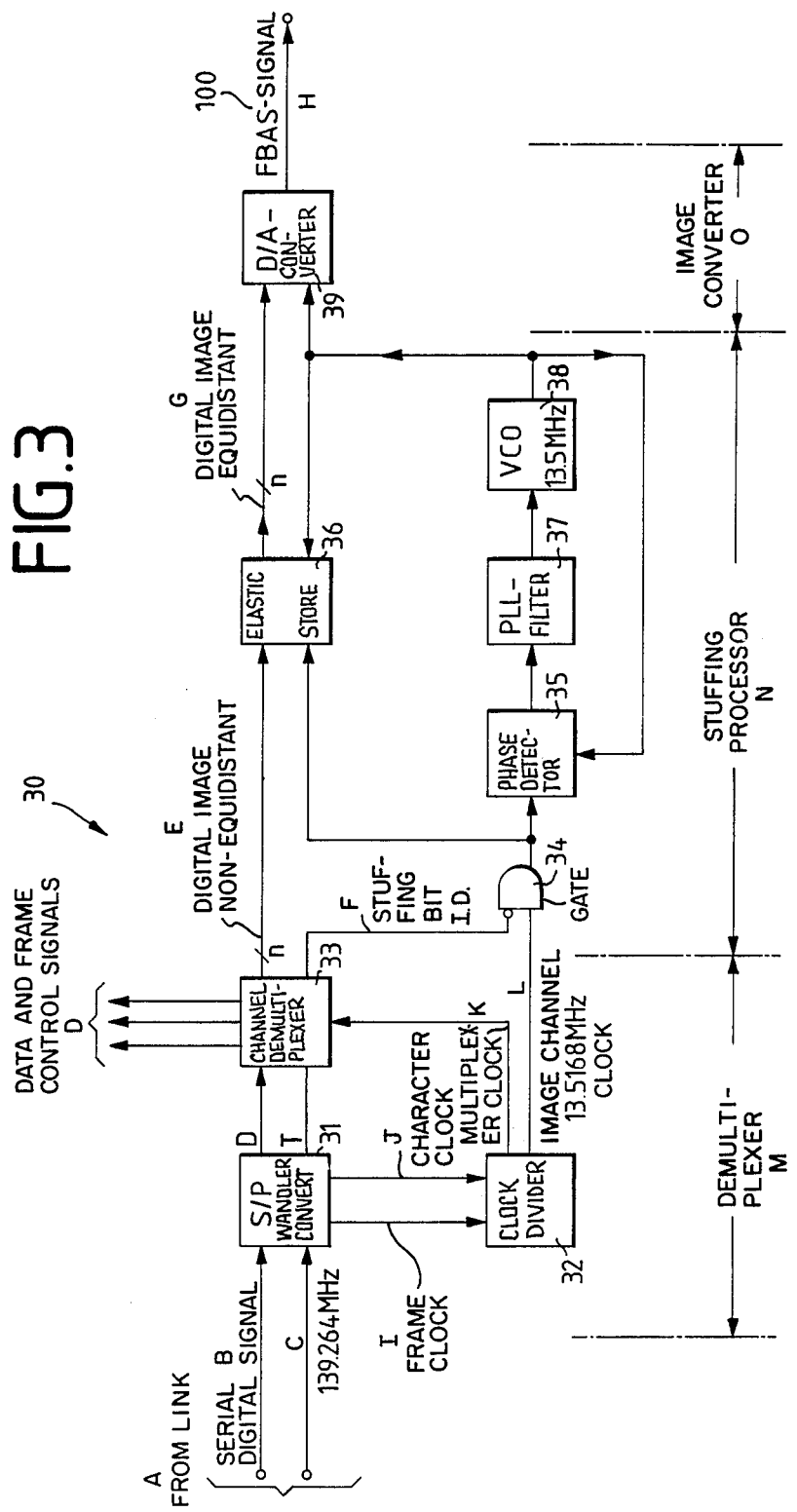
FIG. 3 is a block diagram of the receiver part of the moving-image coder.

FIG. 3 shows a block diagram of the receiver part 30 of the moving-image coder. The self-identification of the stuffing characters is obtained with the use of an additional bit.

The serial 139.264 Mbit/second pulse rate supplied by the transmission link at A are converted to 10-bit characters in a serial-to-parallel converter 31 and are supplied to a channel demultiplexer 33 in this form. In parallel with this, the serial-to-parallel converter 31 also detects the associated character clock pulse from the incoming data as well as the frame clock pulses used to compose the transmission over the link. The character clock pulses and frame clock pulses are used in a clock rate divider 32 for generation of the multiplex clock pulses on line K for the channel demultiplexer 33 and for generation of the 135.168-MHz image channel clock. The channel demultiplexer 33 outputs the 10-bit characters contained in the image channel synchronously with other data on lines D. A 9-bit component is coupled on lines E to the elastic storage 36 (buffer). Bit number 10 is a stuffing identification bit and is coupled to an input of a blocking gate 34. As long as the stuffing identification bit has a state of "0", the blocking gate 34 lets the image channel text on lines E pass into storage 36. If the stuffing identification bit has a state of "1", i.e., indicating that the associated character on lines E is a stuffing character, then the blocking gate 34 blocks the image channel clock pulse on line L for the duration of a clock pulse to thus prevent the input of the stuffing character into the elastic storage 36.

An equal-time-spaced read-out of the 9-bit characters from the elastic storage 36 is carried out with a 13.5-MHz clock pulse generated by an oscillator 38. The image characters from storage 36 are coupled to the digital-to-analog converter 39 and are there converted back to the original composite color video signal 100. The 13.5-MHz clock pulse of the oscillator 38 corresponds exactly in frequency to the frequency of the image characters' input into the elastic storage 36. This is obtained by the action of a phase-lock type control circuit consisting of a phase detector 35, PLL filter 37, and the voltage-controlled oscillator 38. The image channel clock pulses supplied by blocking gate 34 to phase detector 35 are smoothed in a phasewise manner by the phase control circuit; no changing frequency of the clock pulse takes place.

Figure 4:
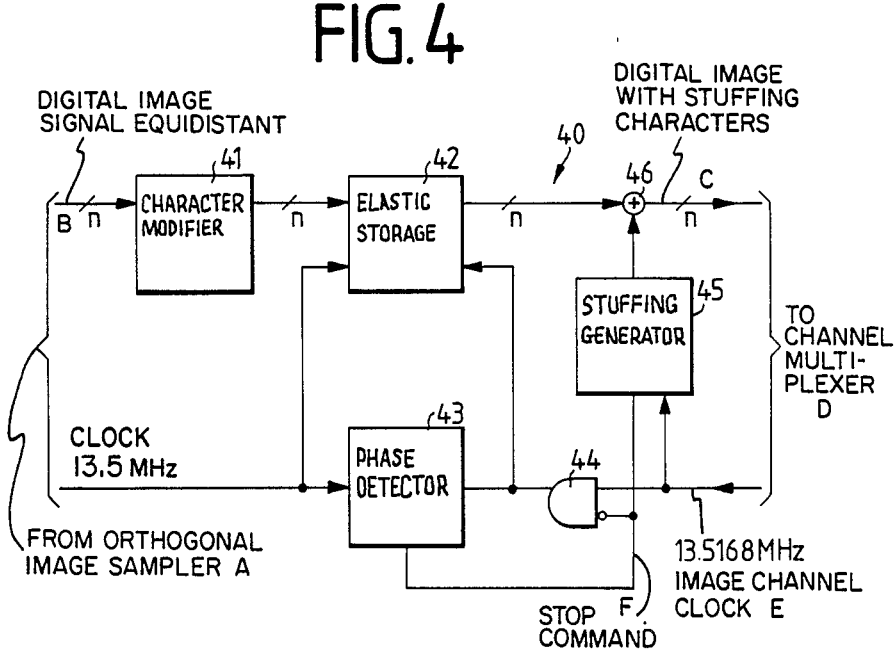
FIG. 4 is a block diagram of a stuffing processor used in the transmitter of the moving-image coder.

FIG. 4 shows the stuffing processor part 40 of the moving-image coder wherein the self-identification of the stuffing characters is done with a special code word. The other parts of the moving-image coder correspond to the design according to FIG. 2.

In the stuffing processor 40, the stuffing character generator 20 shown in FIG. 2 and which puts out an additional-bit identification on a single line, is replaced by the stuffing character generator 45. This, in response to a stuffing command, transmits a stuffing character of n=9 bits through the OR-operation 46 to the channel multiplexer 21 (see FIG. 2). The stuffing character has the value $$0\ 0000\ 0000 \qquad (1)$$

In order to prevent the orthogonal image scanner from inputting image characters with the same value into the elastic storage 42, and thus simulating stuffing characters, a character modifier 41 is connected ahead of the elastic storage 42. If an image character (1) is supplied by the scanner, then the modifier 41 changes the character to the value $$0\ 0000\ 0001 \qquad (2)$$

which cannot be confused with the stuffing character.

This alteration of an image character involves its LSAB (Least Significant Bit) which has been changed by this process from "0" to "1". Through this modification, the image content of the transmitted moving-image is not impaired, since the character (1) occurs only in the image gaps of the composite color video signal.

Figure 5:
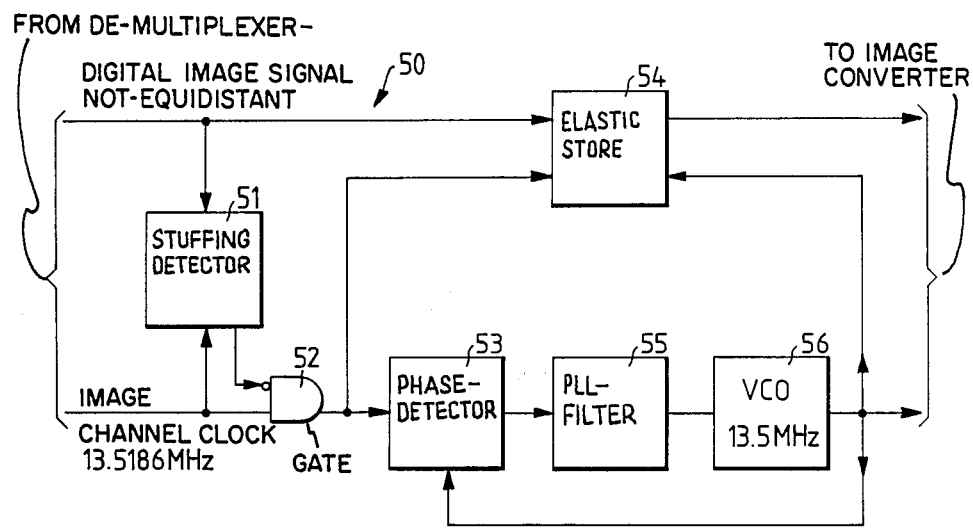
FIG. 5 is a block diagram of a stuffing processor for use in the receiver of the moving-image coder.

FIG. 5 shows the stuffing process or part 50 in the receiver of the moving-image coder wherein the self-identification of the stuffing characters is done by means of a special code word. The other parts of the moving-image decoder correspond to the design according to FIG. 3.

The processor part 50 differs from the processor stuffing part in FIG. 3 by the additional stuffing character detector 51. The entire string of image characters from the demultiplexer is supplied through this stuffing character detector 51. Upon appearance of the stuffing character code word $$0\ 0000\ 0000$$

the detector generates a blocking command which, in the same manner as in FIG. 3, blocks the gate 52 for the duration of a clock pulse. Thus preventing the input of the stuffing character into the elastic storage 54. It is thereby ensured that, through the action of the phase control circuit consisting of phase detector 53, PLL-filter 55 and oscillator 56, regularly-time-spaced read clock is generated, whose frequency has exactly the same value as the image character string input into the elastic storage 54.

Having thus described a technique to adjust the pulse rate of a digitized composite video signal to a pulse rate that is compatible with that of a digital transmission link the advantages of the invention can be appreciated. Variations can be made without departing from the scope of the invention.

List of Reference Numbers
MOVING-IMAGE CODER WITH SELF-IDENTIFICATION OF THE STUFFING CHARACTERS

| | |
|---|---|
| 10 | Moving-image coder/transmitter part |
| 11 | Link clock decoder |
| 12 | Phase detector |
| 13 | PLL-Filter |
| 14 | Divider |
| 15 | Analog-to-digital converter |
| 16 | Oscillator |
| 17 | Elastic storage |
| 18 | Phase detector |
| 19 | Blocking gate |
| 20 | Stuffing identification generator |
| 21 | Channel multiplexer |
| 22 | Parallel-to-serial converter |
| 23 | Clock pulse generator |
| 30 | Image coder receiving part |
| 31 | Serial-to-parallel converter |
| 32 | Clock rate divider |
| 33 | Channel demultiplexer |
| 34 | Blocking gate |
| 35 | Phase detector |
| 36 | Elastic storage |
| 37 | PLL-filter |
| 38 | Oscillator |
| 39 | Digital-to-analog converter |
| 40 | Stuffing processor part/transmitter |
| 41 | Character modifier |
| 42 | Elastic storage |
| 43 | Phase detector |
| 44 | Blocking gate |
| 45 | Stuffing character generator |
| 46 | OR operation |
| 50 | Stuffing processor/receiver |
| 51 | Stuffing character detector |
| 52 | Blocking gate |
| 53 | Phase detector |
| 54 | Elastic storage |
| 55 | PLL-filter |
| 56 | Oscillator |
| 100 | Composite color video signal |
| | A = Input |
| | B = Input |
| FIG. 1 | A = Transmission section |
| FIG. 2 | A = 100 = Composite color video signal from image source |
| | B = Orthogonal scanning clock pulse 13.5 MHz |
| | C = Digital image signal equidistant, evenly time spaced |
| | D = Stuffing identification bit |
| | E = Digital image signal not equidistant |
| | F = Digital audio, telephone, and data signals |
| | G = Digital signals, serial |
| | H = Clock 139.264 MHz |
| | I = Two transmission devices |
| | J = Transmission clock pulses 139.264 MHz |
| | K = Line clock pulses 15.625 MHz |
| | L = Multiplex clock pulses |
| | M = Image channel clock 13.5168 MHz |
| | N = Stuffing command |
| | O = Orthogonal image scanner, sampler |
| | P = Stuffing processor (transmitter) |
| | Q = Multiplex device |
| FIG. 3 | A = From transmission link |
| | B = Digital signals, serial |
| | C = Clock pulses 139.264 MHz |
| | D = Digital audio, telephone and data signals |
| | E = Digital image signals not equidistant |
| | F = Stuffing identification bit |
| | G = Digital image signals equidistant |

-continued

List of Reference Numbers
MOVING-IMAGE CODER WITH SELF-IDENTIFICATION
OF THE STUFFING CHARACTERS

|  |  |
|---|---|
|  | H = Composite color video signal to image display |
|  | I = Frame clock pulses |
|  | J = Character clock pulses |
|  | K = Multiplexer clock pulses |
|  | L = Image channel clock pulses 13.5168 MHz |
|  | M = Demultiplexer device |
|  | N = Stuffing processor (receiver) |
|  | O = Image digital-analog converter |
| FIG. 4 | A = From the orthogonal image scanner |
|  | B = Digital image signal equidistant |
|  | C = Digital image signal with stuffing character |
|  | D = To the channel multiplexer |
|  | E = Image channel clock pulses 13.5168 MHz |
|  | F = Stopping command |
| FIG. 5 | A = From the demultiplexer device |
|  | B = Digital image signal non-equidistant |
|  | C = Image channel clock pulse 13.5186 MHz |
|  | D = To the image digital-analog converter |

I claim:

1. In a process for adjusting the pulse rate of a stream of evenly-time-spaced pulses of a digital moving-image signal representative of a composite color video signal to a higher clock rate used in a digital transmission link with a moving-image coder, the improvement comprising the steps of: generating stuffing digital characters for insertion into the moving-image pulse stream wherein the stuffing characters are identifiable by an additional bit; inserting the stuffing characters into the moving image pulse stream; transmitting the latter pulse stream with the inserted stuffing characters over the link; detecting the stuffing charactes at a receiver end of a moving-image coder by the additional bit; and removing the stuffing character at the receiving end of the link so as to reproduce the evenly-time-spaced image character stream.

2. In a process for adjusting the pulse rate of a string of time-equidistant character pulses of a digital moving-image signal representative of a composite color video signal to a higher clock rate used in a digital transmission link with a moving-image coder, the improvement comprising the steps of: generating stuffing characters of a predetermined code for insertion into the pulse stream of the digital moving-image signal representative of image-scanning values; modifying those digital signals of the image-scanning values that are like the predetermined code for the stuffing characters so as to prevent wrongful identification of a stuffing character; detecting stuffing characters at the receiving part of the moving-image coder; and removing said detected stuffing characters so as to reproduce the originally time-equidistant character string.

3. An apparatus for adjusting the pulse rate of a digitized composite video signal to a pulse rate that is compatible with a pulse rate used in a digital transmission link and using a moving-image coder comprising:
means for generating a digitized composite video signal at a first pulse rate;
means for storing characters of the digitized signal in response to write pulses at said first pulse rate;
means for reading stored characters and generate a serial pulse train representative thereof at a second pulse rate that is higher than the first pulse rate and is compatible for use in said digital transmission link;
means responsive to pulses at the first and second pulse rates for generating a stuffing command when the time interval between a write pulse and a read pulse falls below a predetermined limit;
means for stuffing pulses at the second pulse rate into a stream of pulses from the reading means; and
means responsive to the stuffing command for inhibiting the reading means and activating said stuffing means.

4. The apparatus as claimed in claim 3 wherein the stuffing command generating means comprises
a phase detector (18) coupled to pulses at the first and second rates.

5. The apparatus as claimed in claim 4 wherein the inhibiting means includes a blocking gate placed to suppress a read pulse for the duration needed to insert a stuffing character.

6. The apparatus as claimed in claim 5 wherein the pulse stuffing means comprises a stuffing character generator for effectively stuffing an identification bit into the stream of pulses from the reading means.

7. The apparatus as claimed in claim 6 and further comprising
multiplexer means responsive to pulses from the reading means and the stuffing character generator to produce a serial stream of data pulses therefrom.

8. The apparatus as claimed in claim 3 and further comprising:
means at a receiving location where a digital pulse stream arrives over said transmission link for reproducing therefrom clock pulses at said second pulse rate;
means for storing arriving characters;
means for detecting a stuffing character in the pulse stream arriving at the receiver location;
means responsive to the detected stuffing character for suppressing storage of a character and clock pulses for the duration of the detected stuffing pulse and producing a modified stream of pulses;
means for reproducing from the modified stream of pulses a clock having pulses at the first rate; and
means responsive to the reproduced clock at the first pulse rate for reproducing the composite video signal.

9. The apparatus as claimed in claim 8 wherein the suppressing means includes a blocking gate coupled to respond to the detected stuffing character and said clock pulses at the second pulse rate for inhibiting the latter and the storage of a character in the storing means.

10. The apparatus as claimed in claim 8 wherein the reproducing means includes:
a phase control circuit having a phase detector, a filter and an adjustable oscillator, said oscillator having an operating frequency at said first pulse rate.

11. In an apparatus for adjusting the pulse rate of a digitized composite video signal to a pulse rate that is compatible with a pulse rate used in a digital transmission link and using a moving-image coder the improvement comprising:
means for generating stuffing characters with a self-identifiable characteristic code; and
means for modifying those characters of the digitized composite video signal which exhibit the same characteristic code as the stuffing characters.

12. The apparatus as claimed in claim 11 wherein the characteristic code is selected commensurate with the value of the composite video signal at image-gap locations.

13. The apparatus as claimed in claim 11 wherein the stuffing generator means further includes phase difference detection means responsive to a first clock whose pulse rate is a known multiple of the line frequency used in the composite video signal and responsive to a second clock whose pulse rate is compatible for use in the digital transmission link, said phase difference detecting means causing insertion of a stuffing character in the digitized composite video signal at a predetermined phase difference.

* * * * *